US00RE34152E

United States Patent [19]

Meyer

[11] E Patent Number: Re. 34,152

[45] Reissued Date of Patent: Dec. 29, 1992

[54] IGNITER PLUG WITH VIBRATION DAMPING MEANS

[75] Inventor: Helmut P. Meyer, West Jacksonville, Fla.

[73] Assignee: Unison Industries Limited Partnership, Jacksonville, Fla.

[21] Appl. No.: 566,686

[22] Filed: Aug. 13, 1990

Related U.S. Patent Documents

Reissue of:

[64] Patent No.: 4,764,703
Issued: Aug. 16, 1988
Appl. No.: 87,130
Filed: Aug. 19, 1987

[51] Int. Cl.[5] ..... H01T 13/24; F23Q 3/00

[52] U.S. Cl. ..... 313/126; 313/269; 123/16 EL; 361/253

[58] Field of Search ..... 313/125, 126, 269; 123/169 EL; 361/253

[56] References Cited

U.S. PATENT DOCUMENTS

| | | | |
|---|---|---|---|
| 1,266,009 | 5/1918 | Garaca | 313/125 |
| 1,280,113 | 9/1918 | Johnston | 313/125 |
| 1,352,554 | 9/1920 | Snyder | 313/126 |
| 1,392,329 | 10/1921 | Henney | 313/137 |
| 1,791,190 | 2/1931 | Butusov | 313/126 |
| 3,882,338 | 5/1975 | Meyer | 313/126 X |
| 4,309,738 | 1/1982 | Mulkins et al. | 431/264 X |

*Primary Examiner*—Palmer C. Demeo
*Attorney, Agent, or Firm*—Leydig, Voit & Mayer

[57] ABSTRACT

An igniter plug having a center conductor, an insulator and a conductive outer shell. The insulator surrounds and supports the center conductor axially within the shell along a substantial portion of the length of the center conductor. The insulator is of reduced diameter toward the discharge end of the igniter and terminates short of the full length of the center conductor. The center conductor extending beyond the insulator terminates short of the discharge end of the igniter and has a discharge electrode of greater diameter than the center conductor affixed to the center conductor end. The electrode terminates at the discharge end of the igniter. A helical compression spring is fitted over the center conductor between the end of the insulator and the electrode to absorb vibrations of the center conductor and electrode.

7 Claims, 1 Drawing Sheet

IGNITER PLUG WITH VIBRATION DAMPING MEANS

Matter enclosed in heavy brackets [ ] appears in the original patent but forms no part of this reissue specification; matter printed in italics indicates the additions made by reissue.

The present invention relates to igniter plugs for gas turbine engines. More particularly, it relates to an improved igniter plug having means for reducing vibrations of the central electrode of the igniter.

BACKGROUND OF THE INVENTION

Igniter plugs for gas turbine engines are akin to spark plugs used for ignition in internal combustion engines in that both basically comprise a metal tubular outer shell, a metal central electrode extending axially through the shell and a ceramic core insulator extending coaxially with the central electrode and supporting the electrode within the shell. The differential between the thermal coefficients of expansion of the metal shell and the ceramic core on long iginiter plugs and the severe conditions under which an igniter must operate have led to continuing improvements in the basic igniter plug structure for improved reliability and service life.

The problem of differential expansion between the metal shell and ceramic core was solved, in part, by constructing the core in two cylindrical pieces, one of which telescoped partly within the other. The core piece nearest the combustion chamber end of the shell was sealed to the shell near that end and the core piece extending into the opposite end of the shell was sealed to the shell near the end.

Arc erosion of the insulator at the discharge end of the igniter and subsequent loosening of the insulator frequently caused such igniters to fail prematurely from wear of the insulator due to vibration and loss of contact with the shell.

This problem was addressed in U.S. Pat. No. 3,882,338, issued May 6, 1975 to H. P. Meyer for "Igniter Plug". This patent discloses an igniter in which the forward insulator portion is continuously biased into contact with the forward end of the shell by one or more compression springs. The insulator is thereby constrained against unrestricted movement and the vibrational energy is absorbed by flexure of the spring.

The insulator material used in certain igniters is beryllia. Beryllia possesses good thermal conductivity and other properties which make its use highly advantageous so far as operational characteristics are concerned. However, beryllia is also a highly toxic material, requiring extraordinary precautions in fabrication and disposal of the product. An alternative insulator material which has many of the attractive characteristics of beryllia is boron nitride. Boron nitride is not considered a hazardous material, hence its use eliminates the primary disadvantage of beryllia.

Experimental igniters fabricated with boron nitride insulators operated satisfactorily except that igniters removed from engines before the end of their expected service life have shown excessive wear in the insulator in the area surrounding the electrode tip. Such wear is undesirable because of the increased possibility of cracking of the insulator and increased firing voltage resulting therefrom.

It has been demonstrated that the wear occurring in igniters equipped with boron nitride insulators is not due to spark erosion. Instead, unrestrained vibration of the electrode tip mechanically abrades the insulator, increasing the clearance between the electrode tip and insulator.

U.S. Pat. No. 4,309,738, issued Jan. 5, 1982 to G. F. Mulkins et al., for "Igniter Plug" discloses means for restraining vibration of the electrode tip in an igniter constructed generally as discussed above. The restraining means comprise either a cup-shaped or U-shaped sleeve recessed within the forward end of the insulator surrounding the center conductor of the igniter near the electrode tip. These means restrain vibration of the electrode tip mainly by increasing the rigidity of support. They are disadvantageous in that they require a reduction in the thickness of the surrounding insulator wall and in that they transmit the vibrational forces to the weakest portion of the surrounding insulator.

It is an object of the present invention to provide a means for reducing vibration of the center electrode in an igniter plug.

It is another object of the invention to provide, in an igniter plug, means for reducing vibration of the center electrode which are absorbent of vibrational energy without imposing appreciable load on the igniter insulator.

A further object of the invention is to provide, in an igniter plug, means for reducing vibration of the center electrode which include the ability to partially compensate for differences between the thermal coefficients by expansion of the igniter materials and for misalignments and tolerance variances in the igniter structure.

Other objects and advantages of the invention will become evident as an understanding thereof is gained from the following complete description.

BRIEF DESCRIPTION

Briefly, the invention comprises an igniter plug having a tubular metal shell enclosing an axially extending center electrode. The center electrode is formed of a center conductor extending substantially the length of the shell, a contact button affixed to the conductor at one end and a somewhat enlarged discharge electrode affixed at the opposite end which coterminates with the shell at the combustion chamber end thereof. The center conductor, contact button and electrode are insulated from the shell and supported therein by an insulator core formed in two telescoping pieces. The main insulator piece extends substantially the length of the shell from beyond the contact, terminating short of the electrode. The diameter of the main insulator piece is reduced toward the electrode end thereof. The second insulator piece telescopes over the reduced diameter portion of the first insulator and extends forwardly to the shell end. The second insulator closely surrounds and supports the electrode in the vicinity of the shell end. Vibrations of the electrode responsible for abrasive wear of the second insulator in the area surrounding the electrode are effectively eliminated by a compression spring positioned coaxially with the center conductor at the forward end thereof. The forward end of the spring bears on a shoulder formed on the electrode. The rearward end of the spring bears on a washer fitted coaxially over the center conductor and abutting against the forward face of the first insulator.

DETAILED DESCRIPTION

Figure 1:
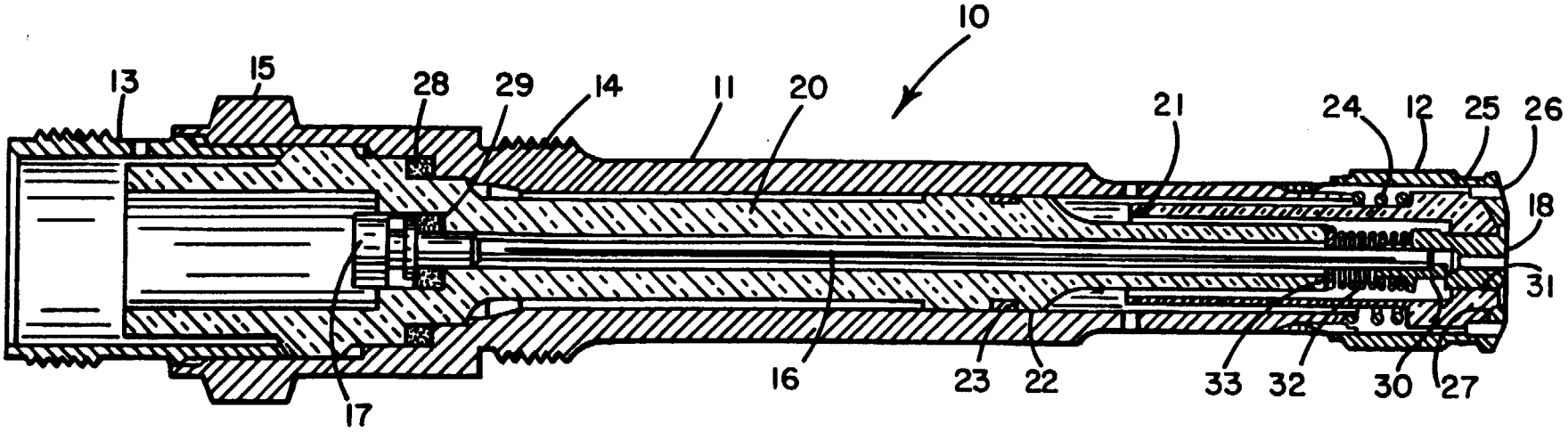
FIG. 1 is an axial section of an igniter plug incorporating the vibration damping means of the invention.

Referring to FIG. 1, the igniter plug comprises a metal shell 10 formed by a main body portion 11, an end portion 12 forming one electrode at which the arc discharge occurs and a connector portion 13 adapted to receive a high voltage ignition cable connector (not shown). Toward the connector end external threads 14 and a hexagonal flange 15 are formed on shell body 11 to enable the igniter to be mounted in an internally threaded port in the wall of an engine combustion chamber (not shown). The shell 10 encloses an axially extending center conductor 16 having a contact button 17 affixed at one end and a discharge electrode 18 affixed at the other end.

Conductor 16, contact 17 and electrode 18 are supported coaxially with shell 10 by a first insulator 20 and a second insulator 21. Insulator 20 includes and enlarged diameter portion 22 which closely fits the bore of shell body 11 toward the forward end thereof and which carries thereon a metal collar 23. Collar 23 is extruded into a close fitting relationship between insulator 20 and shell body 11 during assembly of the insulator to the shell, as described in U.S. Pat. No. 4,593,340.

Shell end piece 12 fits over and is welded to a reduced diameter portion of shell body 11 at the forward end thereof. Intersecting cooling passages 25 and 26 extend radially and axialy through shell piece 12. The interior of shell piece 12 at the forward end is finished with a frusto-conical surface 27 against which a complimentary surface at the forward end of insulator 21 abuts.

Insulator 21 is biased into contact with shell surface 27 by a helical compression spring [28] *24* captured between the forward end of shell body 11 and a shoulder formed toward the forward end of the insulator. This manner of mounting insulator 21 retains the insulator in centered contact with the forward end of shell piece 12 throughout a wide range of operating temperatures and reduces wear and damage to the insulator caused by vibration. Electrode 18, secured to the forward end of conductor 16 by a weldment 30, extends through an axial bore 31 in insulator 21 to the forward face of shell 10. The igniter is sealed against leakage of gas along the outer surface and through the central bore of insulator 20 by fused in place glass seals 28 and 29.

The bore of insulator 20 is dimensioned to provide clearance along the length of center conductor 16 to permit free relative expansion of the insulator and conductor. The conductor is supported principally at its ends by seal 29 and by the loose contact between the surface of electrode 18 and bore 31. Conductor 16 and electrode 18 are free to move laterally, within the clearance space surrounding conductor 16 in insulator 20 and electrode 18 insulator 21. In time, vibrationally induced movements of conductor 16 and electrode 18, especially electrode 18, enlarge the surrounding clearance spaces, particularly in the softer insulator materials, such as boron nitride.

Figure 2:
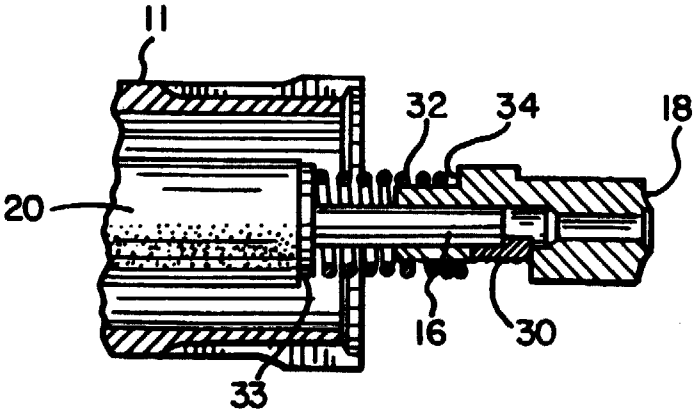
FIG. 2 is an enlarged partial view, in section, showing the igniter center electrode with the vibration damper means of the invention, prior to assembly to the second insulator and shell end piece.

As best seen in FIG. 2, vibrational movement of electrode 18 is damped by a helical compression spring 32 positioned coaxially over the forward end of conductor 16. Spring 32 bears against a washer 33 passed over conductor 16 and held in abuttment with the forward face of insulator 20 by pressure from the spring. The forward end of spring [33] *32* bears against a rear facing shoulder 34 on electrode 18. These damping means of the invention constrain electrode 18 against lateral motion of electrode 18 without restricting relative axial movement between the center conductor and electrode and the insulators. The vibration damping means also permit electrode 18 to be displaced laterally a limited amount to accommodate assembly of igniters in which the center bore of insulator 21 is slightly misaligned with the axis of the electrode.

The invention claimed is:

1. In an igniter plug having a tubular metal shell, one end of which is adapted to mate with a connector on an ignition cable for supplying electrical energy to said plug and the other end of which is formed with a circumferential shoulder serving as a first electrode for spark discharge of electrical energy supplied to said plug;

a core insulator extending axially through said shell, said core insulator being formed in first and second parts, said first core part having an axial bore therein extending the length thereof and aligned with the axis of said shell; said first core part extending substantially from said one end of said shell and terminating at the forward end short of and spaced from said other end of said shell, the diameter thereof along a length adjacent the terminating portion thereof being reduced, said second core part having a central bore adapted to receive and telescope over said reduced diameter portion of said first core part, said second core part extending forwardly beyond the forward end of said first core part and abutting against said shoulder at said other end of said shell;

a central conductor extending through said bore of said first core part with the forward portion of said conductor projecting beyond the forward end of said first core part and terminating within said bore of said second core part, said center conductor being rigidly sealed within said bore of said first core part at a single point located in the vicinity of said one end of aid shell; and a second discharge electrode fixed to the end of said forward portion of said central conductor and extending through said bore of said second core part and terminating substantially coplanarly with said other end of said shell:

improved means for damping vibrations of said central conductor and said second discharge electrode, wherein the improvement comprises:

helical spring fitted coaxially over said forward portion of said central conductor with one end of said spring bearing against the forward end of said first core part and the other end of said spring bearing against said second discharge electrode so as to apply axially directed forces to said first core part and to said second discharge electrode.

2. The improvement as claimed in claim 1, with additionally, a washer positioned coaxially over said forward portion of said central conductor with one face of said washer abutting against the forward end of said first core part, said one end of said spring bearing against the face of said washer opposite said one face.

*3. An igniter plug having a tubular metal shell, a tubular insulator extending axially within said shell said insulator having a main portion with a forward end and a separate end portion which is telescoped over the forward end of said main portion and a conductor extending loosely through a bore of the main portion of said insulator and coaxially to said shell, aid conductor having a forward end and a discharge electrode affixed to its forward end, which electrode in turn passes through a bore in the separate end portion of said insulator, and said conductor and said electrode extending beyond the forward end of the main portion of said insulator, means interposed between said electrode and the forward end of the main portion of said insulator, for applying axially-directed forces to the main portion of said insulator and said electrode and damping radial vibration of said conductor and said electrode induced by the loose fit of the conductor and said electrode within the bores of the main and end portions of said insulator.*

*4. The igniter plug as claimed in claim 3, wherein said means comprises a helical spring.*

*5. The igniter plug as claimed in claim 4, wherein said helical spring is fitted coaxially over the forward end of said conductor between said electrode and the forward end of the main portion of said insulator.*

*6. The igniter plug as claimed in claim 4, wherein said means further comprises a collar slidably, coaxially positioned over the forward end of said conductor and interposed in contacting relationship between said forward end of the main portion of said insulator and said helical spring, said collar device being in a close diametral fit with said conductor.*

*7. The igniter plug as claimed in claim 6 wherein said collar is a washer.*

* * * * *

UNITED STATES PATENT AND TRADEMARK OFFICE

CERTIFICATE OF CORRECTION

PATENT NO. : RE 34,152

DATED : December 29, 1992

INVENTOR(S) : Helmut P. Meyer

It is certified that error appears in the above-identified patent and that said Letters Patent is hereby corrected as shown below:

Column 4, line 58, before "helical" insert -- a --; and

Column 5, line 11, delete "aid" and substitute therefor -- said --.

Signed and Sealed this

Nineteenth Day of April, 1994

Bruce Lehman

BRUCE LEHMAN

*Commissioner of Patents and Trademarks*

*Attest:*

*Attesting Officer*